RECURRING SIGNALLING CONDITION DETECTOR

Filed Feb. 27, 1961 2 Sheets-Sheet 1

INVENTOR.
ROY E. GITTER
BY Alfred C. Hill
AGENT

RECURRING SIGNALLING CONDITION DETECTOR

Filed Feb. 27, 1961 2 Sheets-Sheet 2

INVENTOR.
ROY E. GITTER
BY Alfred C. Hill
AGENT

United States Patent Office 3,144,514

Patented Aug. 11, 1964

3,144,514

RECURRING SIGNALLING CONDITION DETECTOR

Roy E. Gitter, Pompton Plains, N.J., assignor to International Telephone and Telegraph Corporation, Nutley, N.J., a corporation of Maryland Filed Feb. 27, 1961, Ser. No. 92,077
5 Claims. (Cl. 179—15)

This invention relates to a detector and more particularly to a detector of a recurring signalling condition.

A recurring signalling condition can be the presence or absence of a pulse at a particular time every frame of a given signal. The recognition of such recurring signalling conditions can be important in many communication and switching systems as well as other arrangements for analyzing a complex wave. For instance, in many communication systems a synchronizing pulse occurs at a particular time every frame in a multichannel signal. The detection of this synchronizing pulse enables the separation and demodulation of other signals in a multichannel signal. In signal switching systems the number of communication channels between two points can be reduced with respect to the parties wishing to communicate if the absence of a pulse in every frame in a given signal can be detected. This detected condition indicates a vacant communication channel existing between the two points.

Therefore, it is an object of this invention to provide a system to detect a recurring signalling condition within a given signal.

Another object of this invention is to provide a system to detect a recurring signalling condition within a given signal and to provide an output signal therefrom having the timing and repetition frequency of the detected recurring signalling condition relative to the remainder of the given signal.

In accordance with the principles of this invention, a signal generator provides a reference signal capable of having two repetition frequencies and a means responsive to the reference signal and a given signal changes the repetition frequency of the refqerence signal in a predetermined manner between the two given repetition frequencies until a recurring signalling condition is detected. Once the recurring signalling condition is detected, the reference signal is maintained at its normal repetition frequency and the resultant signal can be used as a timing signal. Where the detector of this invention is employed in a digital type system, the production of the timing signal is delayed a predetermined amount until the recurring signalling condition is detected a given number of times to assure the presence of the recurring signalling condition and not merely a repetition of a code condition in signal channels. The detector continuously monitors the given signal and should the recurring signalling condition disappear, the detector will automatically search for another recurring signalling condition.

Figure 1:
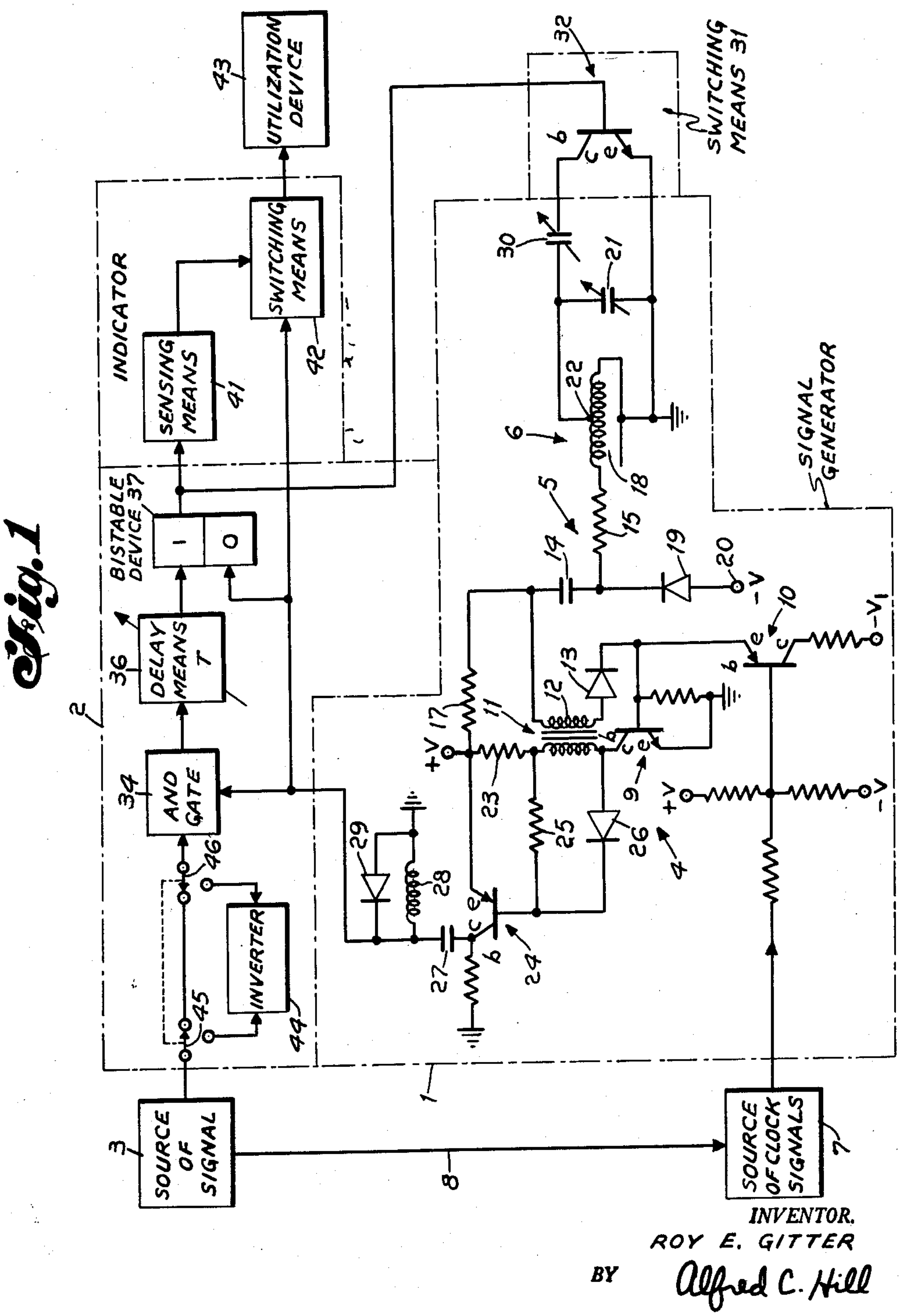
Figure 2:
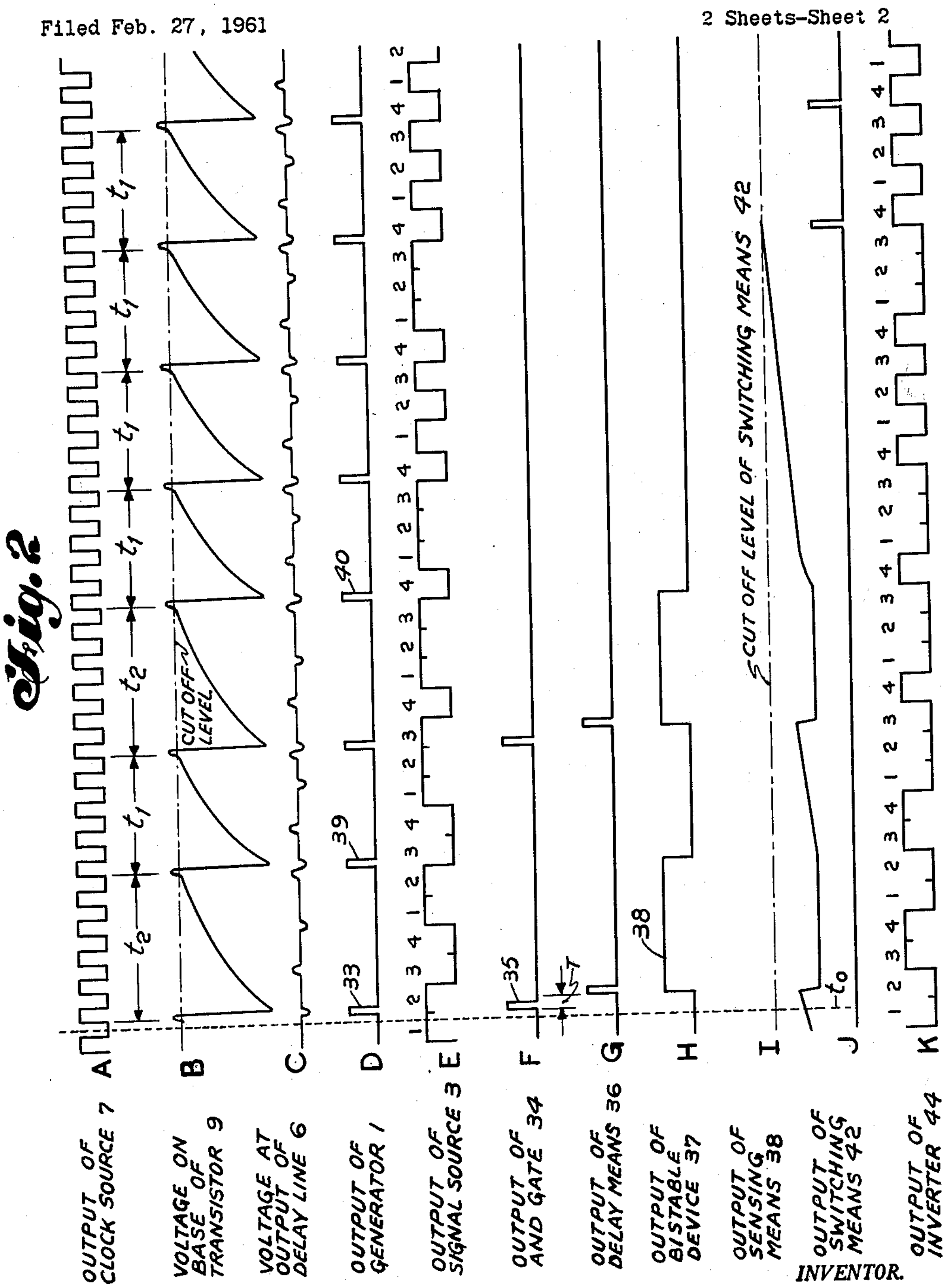

The above-mentioned and other features and objects of this invention will become more apparent by reference to the following description taken in conjunction with the accompanying drawings, in which:

FIG. 1 is a schematic diagram partially in block form of a detector system in accordance with the principles of this invention; and FIG. 2 is a series of curves useful in explaining the operation of the system of FIG. 1.

Referring to FIG. 1, the system of this invention basically comprises a signal generator 1 providing a reference signal capable of having two repetition frequencies and a means 2 responsive to the reference signal and a signal from source 3 to change the repetition frequency of the reference signal in a predetermined manner between the two given repetition frequencies until a recurring signalling condition is detected in the signal of source 3.

More specifically, generator 1 is illustrated for the purposes of explanation to include a blocking oscillator 4 having a resistor-capacitance network 5 to choose one of the multiple reflections of a short-circuited delay line 6 for timing of blocking oscillator 4. To assure proper timing with the signal of source 3 and other associated circuitry, the proper reflection from delay line 6 is gated with the clock signal output of source 7 which may be synchronized with source 3 via conductor 8. Transistor 9 is normally non-conductive and is held in this condition by the synchronizing control transistor 10 which is biased to be normally conductive, thereby maintaining the base of transistor 9 slightly negative. The application of a clock pulse from source 7 biases transistor 10 into a non-conducting state which permits conduction of transistor 9. The collector current of transistor 9 from the +V voltage source through transformer 11 will cause a voltage to appear across winding 12 in the base circuit of transistor 9 in a direction to increase the base current through diode 13. The standard blocking oscillator cycle then follows. Since the voltage at the base of transistor 9 can go only slightly positive, transformer 11 produces a negative sawtooth on condenser 14 when current is drawn from ground through delay line 6, resistor 15 and condenser 14. This pulse of current starts a negative voltage pulse down delay line 6 to short-circuited end 16 thereof. Condenser 14 is recharged slowly from the +V power supply through resistor 17 to maintain a linear rise. When the negative voltage pulse on the delay line reaches short-circuited end 16, the voltage pulse is reflected in opposite polarity. Since the input to delay line 6, end 18, is effectively open-circuited and since the total of the reflected pulse plus the voltage across condenser 14 is still negative with respect to ground, diode 13 will not conduct. The reflections from the open-circuited end of delay line 6, that is, end 18, will not reverse the polarity of the pulse when it starts down the delay line again. A predetermined number of reflections later will cause a positive voltage pulse to arrive at end 18 of delay line 6 having sufficient magnitude when taken in conjunction with the voltage across condenser 14 to allow the reflection to conduct through diode 13 and fire the blocking oscillator when transistor 10 is turned off by another pulse of the clock signals from source 7. The above operation described is illustrated pictorially by curves A, B, and C of FIG. 2 wherein curve A represents the clock signals of source 7, curve B represents the voltage on the base of transistor 9, and curve C represents the voltage at end 18 of delay line 6. The output of generator 1 as derived by the action illustrated in curves A, B, and C is illustrated in curve D of FIG. 2.

Diode 19 prevents the negative voltage pulse fed into delay line 6 from exceeding a given amplitude determined by the bias voltage applied at terminal 20. This makes the rejection of the intermediate reflections of delay line 6 prior to the desired reflection by the network of condenser 14 and resistor 15 easy. Resistor 15 in series with delay line 6 also limits the pulse current and helps to maintain a good ratio of pulse amplitude in the delay line to sawtooth amplitude in the time constant network of condenser 14 and resistor 15.

A variable capacitor 21 is connected to the center tap 22 of delay line 6 as a fine delay adjustment. If the pulse in delay line 6 makes five round trips, this pulse will pass tap 22 ten times which is equivalent to ten capacitors on ten taps of a long delay line. An increase in capacitors will increase the delay time of the pulse and thereby decrease the frequency of the blocking oscillator. The delay of delay line 6 is less than one-tenth of the total time between output pulses of curve D, FIG. 2, since the rise time of the pulse to reach the threshold of diode 13 must be included. The variable capacitor 21 is adjusted to make the total delay of delay line 6 equal to the desired normal repetition frequency of generator 1.

The clock signals from source 7 turn transistor 10 "on" and "off" at a given rate. If the pulse from delay line 6 through diode 13 arrives early, transistor 10 is conducting and thereby prevents the blocking oscillator from conducting. When the clock pulse turns transistor 10 "off," oscillator 4 fires and begins a new cycle. The total delay of delay line 6 is then set to be only slightly less than the given normal repetition frequency of generator 1 so that the clock signals of source 7 determine the time at which the blocking oscillator fires. This insures proper timing of the output pulse of generator 1.

Resistor 23 is placed in series with transformer 11 in the collector circuit of transistor 9. This resistor 23 limits the peak collector current and provides a small voltage to drive transistor 24. When transistor 9 is nonconductive, no collector current is drawn and transistor 24 is cut-off. When transistor 9 becomes conductive, current is drawn through the emitter-base junction of transistor 24 and resistor 25 to turn "on" transistor 24. Resistor 25 and diode 26 across transformer 11 prevent the collector voltage of transistor 9 from going above the supply voltage +V during the overshoot of the transformer pulse. The current through the diode 26 also helps turn off transistor 24 after the transformer pulse. When transistor 24 becomes non-conductive, the collector rises to +V voltage since transistor 24 is saturated. A pulse having a voltage equal to +V is generated with a good rise time, but with too great a width. This pulse rings the series circuit of condenser 27 and inductance 28 into oscillation. The voltage across inductance 28 has a very short rise time and then starts a sine wave at the 90 degree point. A quarter cycle of the resonant frequency brings the voltage down to ground and attempts to go negative. Diode 29 conducts under these conditions and dampens the oscillation. A very sharp pulse of good amplitude and low source impedance is generated from the wide pulse of the saturated output transistor 24. This output is illustrated in curve D, FIG. 2.

As pointed out hereinabove, capacitor 21 enables an adjustment of the repetition frequency of the output signal of generator 1. To provide the detector system of this invention, an external condenser 30 is provided to be placed in shunt relation with capacitor 21 by a switching means 31 illustrated for the purposes of explanation to be a bilateral transistor 32. The value of the external condenser 30 is selected to increase the count of blocking oscillator 4 by 1 so that the output pulse from generator 1 will be delayed to coincide with the signal position in the next adjacent channel in a multichannel system or the next adjacent signal position in any other complex signal. In this manner, it is possible to change the repetition frequency of the output of generator 1 by switching condenser 30 into and out of the blocking oscillator circuit to thereby enable a successful examination of each signal position to detect the desired recurring signalling condition.

To explain the manner in which the detector of this invention operates, let us refer to the curves of FIG. 2 and assume that we are attempting to detect a vacant channel as is represented by channel four of a multichannel signal. Since the blocking oscillator 4 is self-starting, it can be operated on any arbitrary channel time. When the power is applied to the equipment as indicator at time $t_0$ by the vertical dotted line, the conditions are not proper for the blocking oscillator to immediately become conductive but must wait until the next positive output of source 7. The output of source 7 along with the proper reflection from delay line 6 will bring about the conduction of transistor 9 forming an output pulse 33 as indicated at curve D, FIG. 2. This output pulse 33 is coupled to "AND" gate 34 wherein it can be determined whether there is a presence or absence of the desired recurring signalling condition. As illustrated in curve E, FIG. 2, there is a pulse in channel two and, hence, a pulse will be provided at the output of gate 34, pulse 35 as indicated at curve F, FIG. 2. Output pulse 35 is next coupled through delay means 36 and, hence, to bistable device 37. The output of delay means 36 sets bistable device 37 to assume the conduction condition illustrated at 38 in curve H, FIG. 2. The conduction condition 38 of device 37 turns on transistor 32 and thereby connects condenser 30 to ground. This will change the repetition frequency of the output pulse from generator 1 from $t_1$ to $t_2$ to cause the output pulse to appear in the next channel time as indicated in curve D by pulse 39. The output pulse 39 resets bistable device 37 thereby returning the repetition frequency of the output pulse to its normal repetition frequency, $t_1$, permitting the detector to sample or examine the new channel time in the multichannel system. This stepping action will continue until generator 1 detects a vacant channel time, such as indicated at the time of occurrence of pulse 40 of curve D, FIG. 2. It will be observed that channel time four has no pulse and, hence, cannot produce an output from gate 34. With no output from gate 34, no further stepping action can take place and provided that this is truly a recurring signalling condition the output signal of generator 1 will be maintained in its normal repetition frequency, $t_1$.

The delay means 36 is required since the output signal from generator 1 and the output signal from gate 34 occur simultaneously. It should be recalled that the output of generator 1 resets bistable device 37 and, hence, if delay means 36 were not present a conflicting command could result and thereby provide a wrong indication that a recurring signalling condition had been detected.

Since in many instances, and as illustrated in curve E, FIG. 2, a multichannel signal or any complex signal, may be in the form of digital data. As is known in these systems, an occupied channel will not have a pulse present in every frame and, therefore, a channel might be tested and indicate a vacant channel. Therefore, a particular channel must be tested in a number of frames larger than the maximum number of consecutive absences of pulses than can occur before the channel can be assumed to be vacant. A sensing means 41 can be connected to the output of device 37 having a discharge time exceeding the time required for the maximum number of consecutive absences of pulses in a channel. If the output of sensing means 41 were connected to a switching means 42, the output signal of generator 1 would be inhibited from passing to utilization device 43 until it has been ascertained by sensing means 41 that, in fact, a vacant channel has been detected. Once the sensing means 41 has discharged to a point equal to or above the cut-off level of switching means 42, as illustrated in curves I and J, FIG. 2, the output signal of generator 1 will be passed to utilization device 43 with this output signal having the same time relationship as does the detected channel and of course the same repetition frequency.

If all channels are discovered to be occupied, the detector will continue to cycle through the channels and there will be no output until one of the channels becomes vacant and the channel is located and tested. In a switching system an extended period of time with no output can be utilized as an indication that a truck busy condition is present and can actuate a trunk busy signal.

As pointed out hereinabove, the detector system of this invention can be used to locate a channel or signal position that has pulses in every frame. To accomplish this an inverter 44 is coupled between source 3 and gate 34 by means of switches 45 and 46. The output of inverter 44 is illustrated in curve K, FIG. 2, and it will be observed that a trigger or set pulse is coupled to bistable device 37 every time a vacant channel appears in the multichannel signal prior to inversion. The detector system will operate exactly as described hereinabove without the inverter to locate the occupied channel. When operating in this mode the sensing means 41 is adjusted to exceed the maximum number of consecutive presences of pulses that can appear on a normal data channel. The output signal coupled to utilization device 43 identifies the channel always having pulses which in certain communication systems is the synchronizing signal and can be utilized as a reference to demodulate the other channels having a given time relationship to the synchronizing channel.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system to detect a recurring signalling condition within a given signal comprising a blocking oscillator, a delay line coupled to said blocking oscillator to control the output signal of said blocking oscillator to provide a reference signal having a normal repetition frequency, a condenser capable of being selectively coupled to said delay line to provide said reference signal with a second repetition frequency when coupled to said delay line, a coincidence device responsive to said given signal and said reference signal to provide a control signal varying in accordance with the presence and the absence of said recurring signalling condition, and means coupled to said condenser responsive to said control signal to alternately connect and disconnect said condenser to said delay line to change the repetition frequency of said reference signal between said normal and second repetition frequencies until said recurring signalling condition is detected and to maintain said condenser disconnected from said delay line after detecting said recurring signalling condition.

2. A system to detect a recurring signalling condition within a given signal comprising a blocking oscillator, a delay line coupled to said blocking oscillator to control the output signal of said blocking oscillator to provide a reference signal having a normal repetition frequency, a condenser capable of being selectively coupled to said delay line to provide said reference signal with a second repetition frequency when coupled to said delay line, a coincidence device responsive to said given signal and said reference signal to provide a control signal in accordance with the presence and the absence of said recurring signalling condition, a bistable device having a normal conduction condition and a second conduction condition coupled to said coincidence device responsive to said control signal to alternate said conduction condition between said normal conduction condition and said second conduction condition until said recurring signalling condition is detected, and means responsive to said conduction condition to control the connection of said condenser to said delay line, said normal conduction condition maintaining said condenser disconnected from said delay line.

3. A system to detect a recurring signalling condition within a given signal comprising a blocking oscillator, a delay line coupled to said blocking oscillator to control the output signal of said blocking oscillator to provide a reference signal having a normal repetition frequency, a condenser capable of being selectively coupled to said delay line to provide said reference signal with a second repetition frequency when coupled to said delay line, a coincidence device responsive to said given signal and said reference signal to provide a control signal in accordance with the presence and the absence of said recurring signalling condition, a bistable device having a normal conduction condition and a second conduction condition coupled to said coincidence device responsive to said control signal to alternate said conduction condition between said normal conduction condition and said second conduction condition until said recurring signalling condition is detected, and an electronic switch responsive to said conduction condition to control the connection of said condenser to said delay line, said normal conduction condition maintaining said condenser disconnected from said delay line.

4. A system to detect a recurring signalling condition within a given signal comprising a blocking oscillator, a delay line coupled to said blocking oscillator to control the output signal of said blocking oscillator to provide a reference signal having a normal repetition frequency, a condenser capable of being selectively coupled to said delay line to provide a reference signal with a second repetition frequency when coupled to said delay line, a coincidence device responsive to said given signal and said reference signal to provide a control signal in accordance with the presence and the absence of said recurring signalling condition, a time delay means coupled to said coincidence device, a bistable device having a normal conduction condition and a second conduction condition coupled to said delay means responsive to said control signal to alternate said conduction condition between said normal conduction condition and said second conduction condition until said recurring signalling condition is detected, and an electronic switch responsive to said conduction condition to control the connection of said condenser to said delay line, said normal conduction condition maintaining said condenser disconnected from said delay line.

5. A system to generate a timing signal having a timing and repetition frequency equal to the timing and repetition frequency of a recurring signalling condition within a given signal comprising a blocking oscillator, a first delay line coupled to said blocking oscillator to control the output signal of said blocking oscillator to provide a reference signal having a normal repetition frequency, a condenser capable of being selectively coupled to said first delay line to provide a reference signal with a second repetition frequency when coupled to said first delay line, a coincidence device responsive to said given signal and said reference signal to provide a control signal in the absence of said recurring signalling condition, a second delay line coupled to said coincidence device, a bistable device having a normal conduction condition and a second conduction condition coupled to said second delay line responsive to said control signal to alternate said conduction condition between said normal conduction condition and said second conduction condition until said recurring signalling condition is detected, and an electronic switch responsive to said conduction condition to control the connection of said condenser to said first delay line, said normal conduction condition maintaining said condenser disconnected from said first delay line, and means coupled to said generator and said responsive means to provide said timing signal after a predetermined number of said recurring signalling conditions have been detected.

References Cited in the file of this patent

UNITED STATES PATENTS

| | | |
|---|---|---|
| 2,780,672 | Greefkes | Feb. 5, 1957 |
| 2,949,503 | Andrews | Aug. 16, 1960 |
| 2,957,943 | Rack | Oct. 23, 1960 |